United States Patent
Kratt et al.

(10) Patent No.: US 8,560,212 B2
(45) Date of Patent: Oct. 15, 2013

(54) METHOD AND DEVICE FOR OPERATING A GAS INJECTION SYSTEM OF A GAS FUEL AND A LIQUID FUEL OPERATED INTERNAL COMBUSTION ENGINE

(75) Inventors: Alfred Kratt, Schieberdingen (DE); Juergen Foerster, Ingersheim (DE); Christian Mengler, Bietigheim-Bissingen (DE); Thorsten Allgeier, Untergruppenbach (DE); Rudolf Moz, Moeglingen (DE); Winfried Langer, Illingen (DE); Jens Thurso, Kawasaki (JP)

(73) Assignee: Robert Bosch GmbH, Stuttgart (DE)

( * ) Notice: Subject to any disclaimer, the term of this patent is extended or adjusted under 35 U.S.C. 154(b) by 734 days.

(21) Appl. No.: 12/308,634

(22) PCT Filed: Jan. 18, 2008

(86) PCT No.: PCT/EP2008/050586
§ 371 (c)(1),
(2), (4) Date: Aug. 12, 2010

(87) PCT Pub. No.: WO2008/092761
PCT Pub. Date: Aug. 7, 2008

(65) Prior Publication Data
US 2010/0299047 A1 Nov. 25, 2010

(30) Foreign Application Priority Data
Jan. 29, 2007 (EP) ..................................... 07001852

(51) Int. Cl.
*F02B 43/00* (2006.01)

(52) U.S. Cl.
USPC ....... 701/107; 701/112; 123/198 D; 123/525; 123/529

(58) Field of Classification Search
USPC .......... 701/103, 107, 112; 123/525–527, 529, 123/198 D
See application file for complete search history.

(56) References Cited

U.S. PATENT DOCUMENTS

| | | | | |
|---|---|---|---|---|
| 7,654,250 | B2* | 2/2010 | Fujinuma et al. | 123/512 |
| 8,126,636 | B2* | 2/2012 | Jauss | 701/107 |
| 2001/0032628 | A1* | 10/2001 | Goto et al. | 123/529 |
| 2003/0000509 | A1* | 1/2003 | Larsen | 123/575 |
| 2004/0065293 | A1 | 4/2004 | Goto | |
| 2009/0301443 | A1* | 12/2009 | Kojima et al. | 123/513 |

FOREIGN PATENT DOCUMENTS

| | | |
|---|---|---|
| CA | 2 377 640 | 12/2002 |
| CN | 1500179 | 5/2004 |
| DE | 102 41 444 | 3/2004 |
| DE | 10 2005 012940 | 9/2006 |
| RU | 2 136 933 | 9/1999 |
| SU | 1629586 | 2/1991 |
| WO | WO 92/08888 | 5/1992 |

* cited by examiner

*Primary Examiner* — Erick Solis
(74) *Attorney, Agent, or Firm* — Kenyon & Kenyon LLP

(57) ABSTRACT

In a method for generating an internal combustion engine configured to run on both a gas fuel and a liquid fuel, the shutoff valve of the gas injection system is initially closed, the engine is then operated with the liquid fuel, and subsequently all gas injection valves of the gas injection system are opened in a predefined pattern while the shutoff valve is still closed.

11 Claims, 3 Drawing Sheets

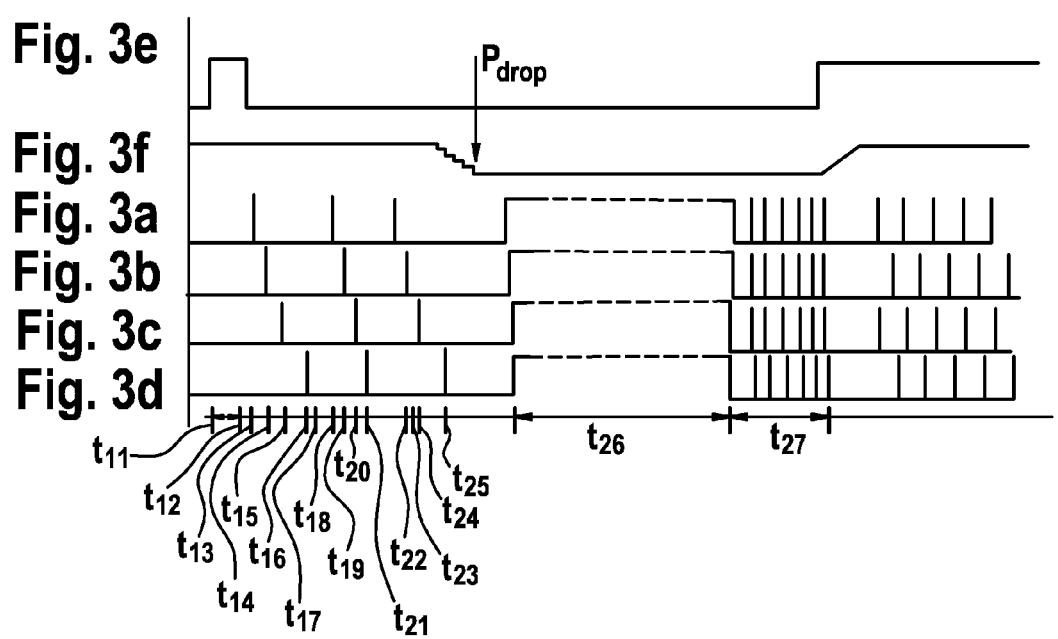

US 8,560,212 B2

METHOD AND DEVICE FOR OPERATING A GAS INJECTION SYSTEM OF A GAS FUEL AND A LIQUID FUEL OPERATED INTERNAL COMBUSTION ENGINE

BACKGROUND OF THE INVENTION

1. Field of the Invention

The invention relates to a method and a device for operating an internal combustion engine configured to operate using a gas fuel and a liquid fuel 2. Description of Related Art The German patent DE10 2005 012 940 discloses a fuel injection device wherein a pressure adjusting valve controls the operation of the fuel injection valve in situation where high gas pressure is developed when the engine is switched off or the fuel is cold.

BRIEF SUMMARY OF THE INVENTION

The method and the device according to the present invention have the advantage of efficiently operating the fuel injection valve by overcoming the problem of stiction experienced by the gas fuel injection valves. The invention also provides reliable operation of the gas fuel injection valves without requiring any additional mechanical components. The problems such as misfiring caused due to delay in opening of the gas fuel injection valves are eliminated. As the opening of the gas fuel injector valves is performed in a set pattern, the air fuel ratio is maintained at a required range and lower exhaust emission is achieved. Abnormal combustion is also eliminated.

The present invention enables opening of the gas injection valves by reducing the gas pressure developed across the gas fuel injection valves when the engine is switched on especially during a cold start. The invention does not involve any complicated procedures. The gradual process of reducing the pressure developed across the gas injection valves helps in maintaining the air fuel mixture ratio without disturbing and therefore results in clean exhaust gas emission. The process of operating the valves based on at least or combination of pressure of gas fuel, speed of internal combustion engine and air fuel ratio, further enable in controlling the exhaust gas emission. The invention enables a systematic approach of operating the gas fuel injection valves within a short duration of time. According to the present invention, the gas fuel injection valves that experiences difficulty in appropriate opening of valves is made to operate in a gas fuel injection mode by following a sequence of patterns as a result inefficient opening of the valves due to high pressure developed across the gas fuel injector valves especially during cold start is prevented.

Furthermore an intermediate step of opening the valves for a predetermined time enables quick heating of the valves, to further enhance the opening of the gas injection valves and stiction of the valves to temperature drop is also reduced. The invention also avoids the need for any external heating elements. As result overall cost involved is also reduced.

Pressure sensing unit and temperature sensing unit provides accurate results required for improving the operation of open-close state of the fuel injection valves. The overall operating efficiency of the internal combustion engine is improved.

BRIEF DESCRIPTION OF THE SEVERAL VIEWS OF THE DRAWING

FIG. 3 shows the graphical representation of the operation of gas fuel injection valves of the gas fuel injection system according to one of the embodiments of the present invention.

DETAILED DESCRIPTION OF THE INVENTION

In recent years, for the purpose of achieving lower exhaust gas emission, developments of vehicles equipped with an engine using gas fuel such as compressed natural gas have been used. Natural gas sometimes used as a fuel for internal combustion engines has the capability of producing less combustion pollutants and decreasing engine operating costs without complex emission control devices. This invention deals with combustion engine operating on Bi-fuel that means both liquid fuel like gasoline, diesel and gas fuel like compressed natural gas CNG. The gas fuel for example, natural gas, with a pressure up to approx. 20 MPa is supplied from a high pressure tank.

The air pollution problems inherent in the operation of gasoline fueled and diesel oil fueled internal combustion engines are well known. For this reason various emission control devices are presently in use, and indeed are required by federal regulations, to reduce the amount of pollutants discharged into the atmosphere by internal combustion engines. These emission control devices, however, only remove a portion of the pollutants and are subject to deterioration with the passage of time. Also, they often hinder engines from operating at peak efficiencies. Natural gas is also sometimes used as a fuel for internal combustion engines. It has the capability of producing less combustion pollutants and decreasing engine operating costs without complex emission control devices.

Now a days there is increase in number of vehicles that are operated on bifuel that is a possibility to run on liquid fuel or gas fuel.

Figure 1:
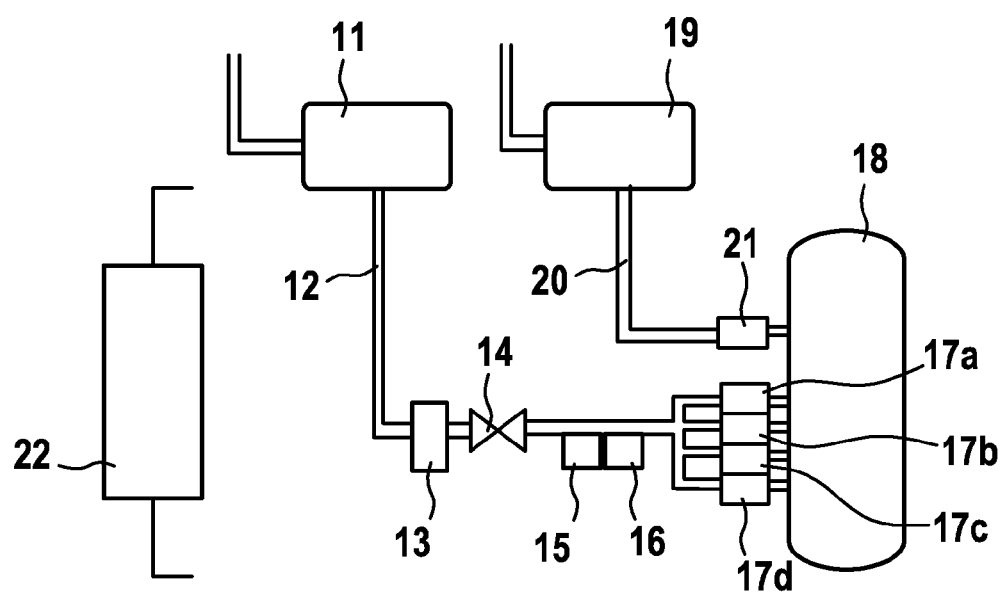
FIG. 1 shows the schematic diagram of a gas fuel injection system according to the present invention.

FIG. 1 shows the schematic diagram of a fuel injection system according to the present invention. The fuel injection system of an internal combustion engine 18 operating with bi-fuel comprises of a liquid fuel tank 19 and a gas fuel tank 11. The liquid fuel tank 19 storing the liquid fuel such as gasoline has a fuel supply path 20. The liquid fuel is supplied through the fuel supply path 20, to a liquid fuel injection valve 21. Here only one liquid fuel injection valve is shown as exemplary. However, with the most of the vehicles with internal combustion engine have several liquid fuel injection valves, particularly four injection valves, are intended to supply an appropriate number of combustion chambers with the liquid fuel. The fuel injection valve 21 ejects the liquid fuel to the internal combustion engine 18. The gas fuel tank 11 is a high pressure tank and has a fuel supply path 12. A high pressure regulator 13 is provided along the fuel supply path 12 to regulate the pressure of gas fuel along the fuel path 12. A shut off valve 14 is provided along the fuel supply path 12. The shut off valve 14 when closed prevents the flow of gas fuel from the gas fuel tank 11 to the combustion engine 18. Sensing units such as pressure sensing unit 15 and temperature sensing unit 16 are provided to measure the pressure and temperature of the gas fuel entering the plurality of gas fuel injection valves (17a-17d). Here only four injectors are shown as exemplary. However, with the most of the vehicles with internal combustion engine have several injection valves, particularly 4 injection valves, are intended to supply an appropriate number of combustion chambers with the gas fuel. The sensing units (15, 16) are provided along the fuel supply path 12 between the shut off valve 14 and the fuel injection valves (17a-17d). An electronic control unit 22 that which is not shown in the figure as connected to the other components of the gas fuel injection system regulates the operation of the gas injection valves controls the functions of the components of the fuel injection system and reads the data of the sensing units.

The gas fuel or the compressed gas is supplied to the internal combustion engine by gas fuel injection valves. Each gas fuel injection valve has a sealing seat. The sealing seat of the gas fuel injection valve can be made from elastomeric material or any other material such as steel. The sealing seat is compressed when the valve is closed and returns to its original shape when the valve is opened again. Generally when the temperature in the surroundings becomes cooler the gas fuel injection valves do not open reliably. Usually gas fuel contains small quantities of oil that cannot be removed completely by a filter. During cold start of an engine, these oils which have low viscosity form a residue on the sealing seat. This increases the force required to open the valves. Further force is needed to open the valves because a very high pressure is developed across the gas fuel injection valves. The above problems lead to misfiring and delay in engine start, if started with gas fuel. If it is possible to reduce the pressure of the gas fuel the overall force that is needed to open the valves can also reduced. The invention discloses a method explaining how the pressure of the gas fuel is reduced and how the valves are opened in a predetermined pattern to reduce the problem of stiction and in turn to open the gas fuel injection valves reliably against the force exerted by the gas fuel during normal operation which means when operated on gas fuel.

Figure 2:
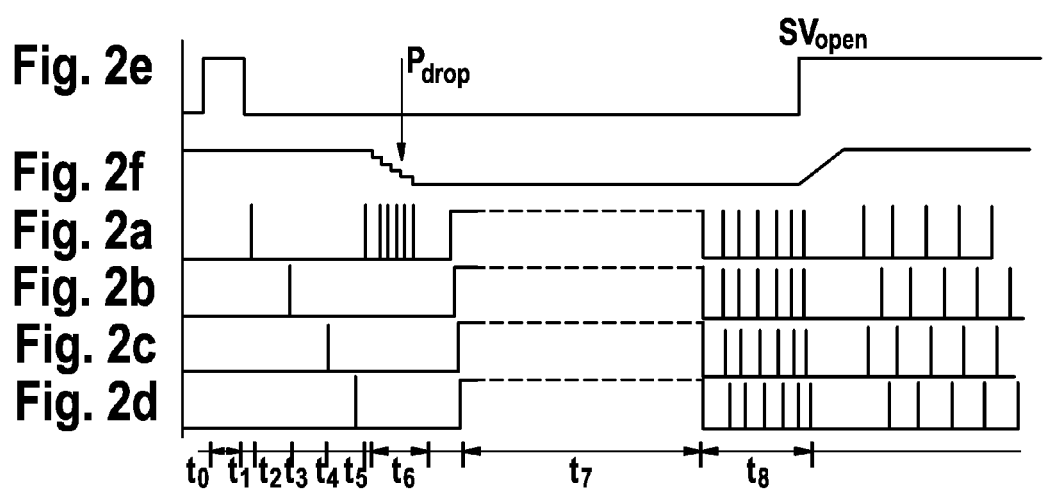
FIG. 2 shows the graphical representation of the operation of gas fuel injection valves of the gas fuel injection system according to the present invention.

FIG. 2 shows the graphical representation of the operation of the fuel injection valve in a gas fuel injection system when an engine is cranked during a cold start. FIG. 2e shows the operating signal of the electronic control unit for the shut off valve 14 (high signal: shut off valve is open; low signal: shut off valve is closed) that regulates the supply of gas fuel to the gas fuel injection valves (17a-17d) according to the present invention. The FIG. 2f shows the pressure characteristic in a gas fuel injection system. The FIG. 2a-2d shows the operating signal of the electronic control unit of the gas fuel injection valves (17a-17d) (high signal: valve is open; low signal: valve is closed).

When the engine is cranked during a cold start, a high pressure appears across the gas fuel injection valves and the gas fuel injection valves cannot be opened with the gas fuel supplied from the gas fuel supply tank. As a result there is delay in starting the engine. In order to overcome the problems faced with regard to the opening to the gas fuel injection valve during cold start a unique and an efficient method and device is described herein as follows.

The engine is started with liquid fuel supplied from the tank 19. As shown in FIG. 2e the shut off valve 14 is opened at $t_0$ and is closed at $t_1$ so that supply of gas fuel is stopped. The vehicle is continued to be operated in liquid fuel, since opening of the shut off valve without opening the gas fuel injection valves does not supply gas fuel to the engine. This invention also holds well if the shutoff valve is closed and then followed by engine start. In order to reduce the pressure across the valves, at least one gas fuel injection valve that opens among the plurality of gas fuel injection valves has to be detected. As shown in FIG. 2 the gas fuel injection valve 17a is tried to open at $t_2$. If the valve 17a does not open then the gas fuel injection valve 17b is tried to open at $t_3$. The process of detecting a valve that opens is continued until a gas fuel injection that opens is detected. As shown in the FIG. 2a, 2b, 2c the gas fuel injection valves 17a, 17b, 17c does not open for the time $t_2$, $t_3$, $t_4$. The gas fuel injection valve 17d is detected to be opening at $t_5$ as shown in FIG. 2d. The valve 17d is detected to be opening at $t_5$ because the pressure as shown in FIG. 2f is reduced by a small amount. This is the reason why the shutoff valve is opened for a short while in the beginning because shortly from the normal operation the pressure drop caused by opening the valve 17d is significant. In order to reduce the pressure developed, the valve that is detected to be opening is opened and closed slowly such that the pressure across the valve is reduced gradually and at same time the amount of liquid fuel is also reduced by an amount of liquid fuel that is equivalent to the amount of gas fuel injected by the valve that opens. The opening of the valve reduces the pressure across all valves. The pressure $P_{drop}$ as shown in FIG. 2f shows the gradual decrease of pressure across the valve. As a result the force across the valves is reduced and allows the valves to be opened reliably. After reducing the pressure across the gas fuel injection valves, all the fuel injection valves are maintained in open state for a predetermined time $t_7$. The opening of all the valves for a predetermined time enables internal heating of the valves to further enhance the operation of gas fuel injection valves during cold start. The gas fuel injection valves have electromagnetic coils. These electromagnetic coils have a resistance and when the coils are energized by a current flow the gas fuels injection valves are heated. In order to stabilise the operation of the gas fuel injection valves the valves are then set to rapid movement at $t_8$ for a predetermined frequency. After the rapid movement the shut off valve is opened $SV_{open}$ again. As the shut off is opened, now the gas fuel injection valves are operated in normal mode that is the supply of gas fuel injection is increased and the supply of liquid fuel is decreased.

According to a further embodiment of the present invention, FIG. 3 shows the graphical representation of the operation of the fuel injection valve in a gas fuel injection system when an engine is cranked during a cold start. FIG. 3e shows the operating signal of the electronic control unit for the shut off valve 14 (high signal: shut off valve is open; low signal: shut off valve is closed) that regulates the supply of gas fuel to the gas fuel injection valves (17a-17d) according to the present invention. The FIG. 3f shows the pressure characteristic in a gas fuel injection system. The FIG. 3a-3d shows the operating signal of the electronic control unit of the gas fuel injection valves (17a-17d) (high signal: valve is open; low signal: valve is closed).

The engine is started with liquid fuel supplied from the tank 19. As shown in FIG. 3e the shut off valve 14 is opened at $t_{10}$ and is closed at $t_{11}$ so that supply of gas fuel is stopped. The vehicle is continued to be operated in liquid fuel, since opening of the shut off valve without opening the gas fuel injection valves does not supply gas fuel to the engine. This invention according to this embodiment also holds well if the shutoff valve is closed and then followed by engine start. In order to reduce the pressure across the valves, the gas fuel injection valves are operated in a set pattern such that the gas fuel injection valve 17a as shown in FIG. 3a, is operated at $t_{12}$, similarly the gas fuel injection valve 17b, 17c, 17d are operated at $t_{13}$, $t_{14}$ and $t_{15}$ as shown in FIG. 3b, FIG. 3c and FIG. 3d. The gas fuel injection valve (17a-17d) are continued to be operated at $t_{16}$-$t_{24}$ as shown in FIG. 3a-3d such that a small amount of gas fuel is injected until a low pressure $P_{Low}$ is detected. The amount of gas fuel is small in the sense that the equivalent of liquid fuel is less than 15% of the equivalent amount of liquid fuel. So the air/fuel ratio is only disturbed by a small amount. As a result the force across the valves is reduced and allows the valves to be opened reliably. After reducing the pressure across the gas fuel injection valves, all the fuel injection valves are maintained in open state for a predetermined time $t_{25}$ as described in FIG. 2 at $t_7$. Further in order to stabilise the operation of the gas fuel injection valves the valves are then set to rapid movement for a predetermined frequency at $t_{28}$ as described in FIG. 2 at $t_8$. After the rapid movement the shut off valve is opened $SV_{open}$ again.

This invention of performing a preset operation of the gas injection valve prior to running the internal combustion engine in gas fuel, improves the performance of the gas fuel injection valves. The present invention overcomes the problem of stiction of the sealing seat of gas fuel injection valves during cold start and enables efficient operation of the gas fuel injection valves without any delay and intern improves the overall efficiency of the internal combustion engine. The exhaust emission is also controlled efficiently.

The present invention eliminates the need for any external heating elements to warm up the gas fuel injection valves during cold start. Therefore the cost involved is also reduced and the time involved in mounting additional mechanical components is reduced.

The invention claimed is:

1. A method of operating an internal combustion engine operated with both a gas fuel and a liquid fuel, the engine having a gas injection system including a gas fuel tank, a shutoff valve and a plurality of gas injection valves, the method comprising:
   initially closing the shut off valve of the gas injection system;
   operating the engine with the liquid fuel; and
   subsequently opening all gas injection valves in a predefined pattern, while the shutoff valve of the gas injection system is still closed.

2. The method as recited in claim 1, wherein the opening of the gas injection valves in the predefined pattern includes:
   reducing the pressure across all the gas injection valves and monitoring the gas injection valves until at least one gas injection valve is determined to be opening; and
   further reducing the gas pressure developed across all the gas injection valves by opening the determined at least one gas injection valve.

3. The method as recited in claim 1, wherein the opening of the gas valves in the predefined pattern includes:
   reducing the pressure across all the gas injection valves by operating the gas injection valves for a predetermined time to provide a predetermined amount of injection of the gas fuel, wherein the reduction of the pressure is continued until a low pressure is detected.

4. The method as recited in claim 2, wherein, as the pressure is reduced across the gas injection valves, the supply of liquid fuel is correspondingly reduced.

5. The method as recited in claim 2, wherein the determination of the at least one gas injection valve to be opening is performed based on at least one of: (a) pressure of gas fuel across the at least one gas injection valve, (b) speed of the internal combustion engine, and (c) air-fuel ratio.

6. The method as recited in claim 1, wherein the opening of the gas injection valves in the predefined pattern is performed over a predetermined time to heat the gas injection valves by a resistive loss in a coil of each gas injection valve.

7. The method as recited in claim 2, further comprising:
   after a predetermined time period following the opening of all the gas injection valves in the predefined pattern, rapidly closing and opening the gas injection valves over a period of time at a predetermined frequency.

8. The method as recited in claim 7, further comprising:
   after the rapid closing and opening of the gas injection valves over the period of time, opening the shutoff valve to operate the internal combustion engine by the gas fuel.

9. The method as recited in claim 8, wherein the gas fuel is a compressed natural gas.

10. The method as recited in claim 8, wherein the gas injection system is provided with at least one of a pressure sensing unit, a temperature sensing unit, and a speed sensing unit.

11. A device to control the operation of an internal combustion engine operated with both a gas fuel and a liquid fuel, comprising:
   a control unit configured to:
   determine a start of the internal combustion engine;
   close a shut off valve of a gas fuel injection system of the internal combustion engine;
   start operating the internal combustion engine by using the liquid fuel; and
   subsequently opening all gas injection valves in a predefined pattern, while the shutoff valve of the gas injection system is still closed.

* * * * *

UNITED STATES PATENT AND TRADEMARK OFFICE
CERTIFICATE OF CORRECTION

PATENT NO.        : 8,560,212 B2
APPLICATION NO.   : 12/308634
DATED             : October 15, 2013
INVENTOR(S)       : Kratt et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1113 days.

Signed and Sealed this
Fifteenth Day of September, 2015

Michelle K. Lee
*Director of the United States Patent and Trademark Office*